No. 707,425. Patented Aug. 19, 1902.
E. KEMPSHALL.
MANUFACTURE OF PLAYING BALLS.
(Application filed June 23, 1902.)
(No Model.)
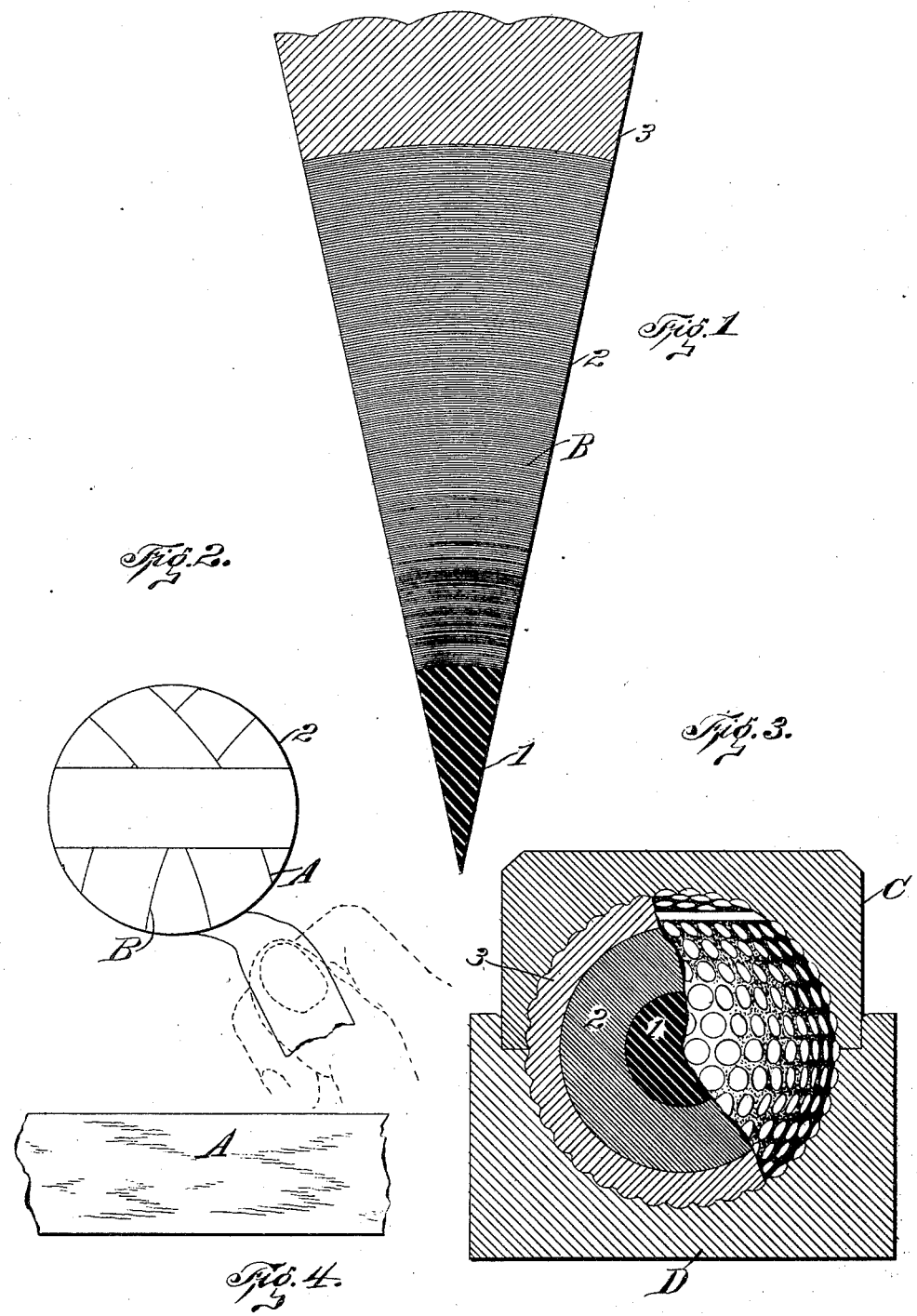
Witnesses:
Wm. Q. M'Kenzie
Fred. E. Maynard
Inventor,
Eleazer Kempshall,
By his Attorney,
J. W. Richards

UNITED STATES PATENT OFFICE.

ELEAZER KEMPSHALL, OF BOSTON, MASSACHUSETTS.

MANUFACTURE OF PLAYING-BALLS.

SPECIFICATION forming part of Letters Patent No. 707,425, dated August 19, 1902.

Application filed June 23, 1902. Serial No. 112,741. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Playing-Balls, of which the following is a specification.

This invention relates to the manufacture of playing-balls; and its objects are to increase the flying power thereof and also to render them buoyant in water.

In the accompanying drawings, Figure 1 is an enlarged segment of a golf-ball made in accordance with my improvements. Fig. 2 illustrates the filling or body of the ball. Fig. 3 is a part sectional view illustrating the final stage in making a ball.

In the several views similar parts are designated by similar characters of reference.

For the center piece of the ball I employ a small sphere 1, preferably of celluloid or other hard springy material. Upon this compound center piece I apply approximately pure sheet-rubber, layer over layer, to form the filling 2 of the ball, and upon this filling I place a shell 3 of plastic material, preferably gutta-percha and preferably holding the filling under compression.

In winding the filling 2, which forms the principal part of the body of the ball in the illustrated construction, I employ a very thin sheeting of acid-cured rubber A—that is, rubber which has been changed from the crude to a usable state by a well-known acid process, as distinguished from the more common process of mixing raw rubber with sulfur and then subjecting the mixture to heat. Specimens of acid-cured rubber are the commercial "surgeon's rubber," or "dental rubber," or "dental dam." This contains little or no foreign dead mixture which would impair its strength or elasticity, and it is much stronger than rubber which is vulcanized by being first mixed with sulfur and then heated, and hence performs an important function in my improved ball, because it can be drawn extremely thin and withstands great strain, and by these combined qualities I am enabled to make a substantially solid ball all portions whereof are under high tension. This solidity is effected by the thinness to which the sheeting is drawn in connection with the hard packing action due to the tenseness of the overlying windings, which it will be understood pack the inner layers in a most effectual manner. It will be perceived that owing to the solidity of a ball thus formed lateral flow of the rubber sheet or strip becomes impossible—that is, such flow as would occur at the unconfined edges of an ordinary plate of rubber when subjected to pressure—and hence any further distortion of the rubber when the ball is struck can occur only in directions longitudinally of the strips, and since this is already highly tensioned the ball exhibits phenomenal flying power. Moreover, the described ball of solid windings is so hard and so highly tensioned as not to be unduly affected by a light blow, rendering the ball also excellent for "putting." This sheeting I wind continuously in miscellaneous directions, layer over layer, as indicated at B. I prefer to use sheeting originally from nine one-thousandths to twelve one-thousandths of an inch in thickness and tensioned to an extent to reduce its thickness to from three one-thousandths to four one-thousandths of an inch. It will be understood that owing to its strength thin sheeting of acid-cured rubber may be employed and that it may be stretched until it is extremely thin, since this quality or kind of rubber stands very great stress without breaking. In this way—that is, by using extremely thin windings—I can make a substantially solid sphere of rubber which is highly tensioned in all directions and is hence powerful when given a hard blow, while being too highly strung to be materially affected by a light blow, so that it is well adapted for the game of golf. By reason of its extraordinary thinness the sheeting winds very compactly, forming a solid body—that is, a body containing no perceptible crevices. The solidity of the body I regard as a feature of great importance.

In using the term "acid process" herein I mean to distinguish from that vulcanizing process which consists of mixing sulfur mechanically with rubber and then subjecting the mixture to heat, said acid process involving the surface treatment or immersion of the raw rubber sheet in a suitable bath—as, for instance, in a bath consisting of a mixture of dichlorid of sulfur and carbon disulfid.

The highly-tensioned sheeting has not only the advantage of being extremely elastic and not only packs closely layer upon layer to form a solid ball, but it will also be seen that because of its thinness a great number of layers can be compacted within the allotted space, as at B, Fig. 1, and since each layer is independently tensioned a large amount of power is stored up on the ball. In short, my filling consists principally of a solid ball of rubber whose different portions are tensioned in miscellaneous directions, each portion being distended to many times its normal length.

By excluding foreign material from the rubber sheeting many advantages are gained in constructing a golf-ball which is of small size. Foreign material, which is comparatively inelastic, not only displaces its bulk of the highly-elastic rubber sheeting, but by its presence also interferes with the action of the rubber. In other words, the mixing of foreign material makes more work to be done and reduces the amount of the rubber for doing the work. Moreover, by having the rubber approximately pure it is found that a very thin sheet thereof withstands a high degree of tension, so that a multitude of highly-tensioned sheets may be embodied in the ball, thus materially augmenting its flying power. Again, by using approximately pure cured rubber in forming the body the golf-ball is rendered buoyant in water, so that if accidentally driven into a lake or stream it can be readily located and recovered. By reason of the pressure to which the several layers are subjected by the windings thereon the layers are caused to cleave one to another to some extent, thus improving the stability of the ball under a blow. I apprehend that when the ball is given a blow the outer layer or envelop of tensioned rubber is subjected to a still greater tension, said envelop being of spherical form and containing a solid mass, so that the only effect possible to produce by a blow is a change of shape of the ball from a true sphere, which change of shape necessarily stretches said outer layer. I apprehend, further, that the successive inner layers are also subjected to extra tension for the same reason. Since there are a multitude of these highly-tensioned rubber layers and all are simultaneously given an extra tension by a blow from a club and since their reaction is instantaneous, the ball flies from the club with phenomenal speed.

The gutta-percha shell 3 may be formed of hemispherical segments, which are preferably welded upon the filling 2 under heat and pressure. The heat and pressure cause the outer layer of rubber to adhere to the gutta-percha shell and also render the rubber layers throughout the filling 2 more adherent, so that they cleave better to one another, thus improving the playing qualities of the ball. The compression is maintained while the gutta-percha cools and hardens, so that the filling is held under compression by the shell or cover.

Having described my invention, I claim—

1. A process in producing a playing-ball, consisting in winding in miscellaneous directions under high tension upon a center piece a multitude of layers of approximately pure acid-cured sheet-rubber which is drawn by the tension to such thinness that the layers pack together to form a solid body, and applying upon said body under heat and compression a cover of plastic material, the heat and compression being carried to an extent to cause at least the outer layers of rubber to cleave to one another.

2. A process in producing a playing-ball, consisting in winding in miscellaneous directions under high tension upon a center piece a multitude of layers of approximately pure acid-cured sheet-rubber which is drawn by the tension to such thinness that the layers pack together to form a solid body, and applying upon said body under heat and compression a cover of gutta-percha, the heat and compression being carried to an extent to cause at least the outer layers of rubber to cleave to one another and also cause the outer layer of rubber to adhere to the gutta-percha cover.

3. A process in producing a playing-ball, consisting in winding under high tension upon a center piece a multitude of layers of approximately pure acid-cured sheet-rubber which is drawn by the tension to such thinness that the layers pack together to form a solid body, and applying upon said body under heat and great compression a cover of plastic material, and maintaining the compression while the cover cools and hardens.

ELEAZER KEMPSHALL.

Witnesses:
B. C. STICKNEY,
F. W. BARNACLO.